June 14, 1927.
A. Y. DODGE
1,632,121
UNIVERSAL JOINT
Filed March 7, 1924       2 Sheets-Sheet 1
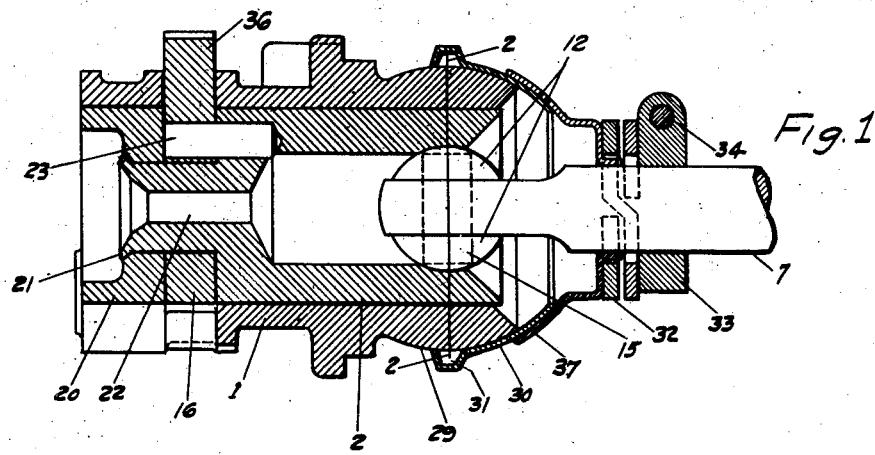
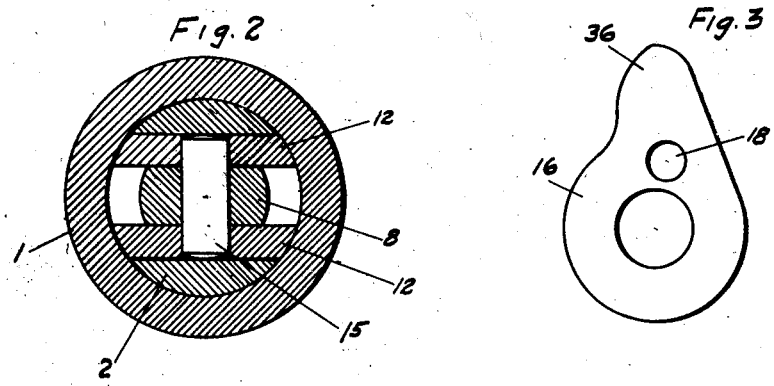
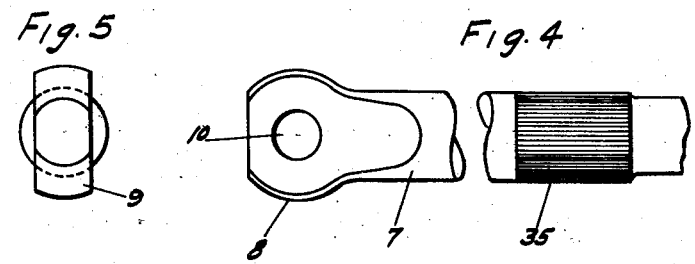
INVENTOR
ADIEL Y. DODGE,
BY
A. D. T. Libby
ATTORNEY June 14, 1927.
A. Y. DODGE
1,632,121
UNIVERSAL JOINT
Filed March 7, 1924
2 Sheets-Sheet 2
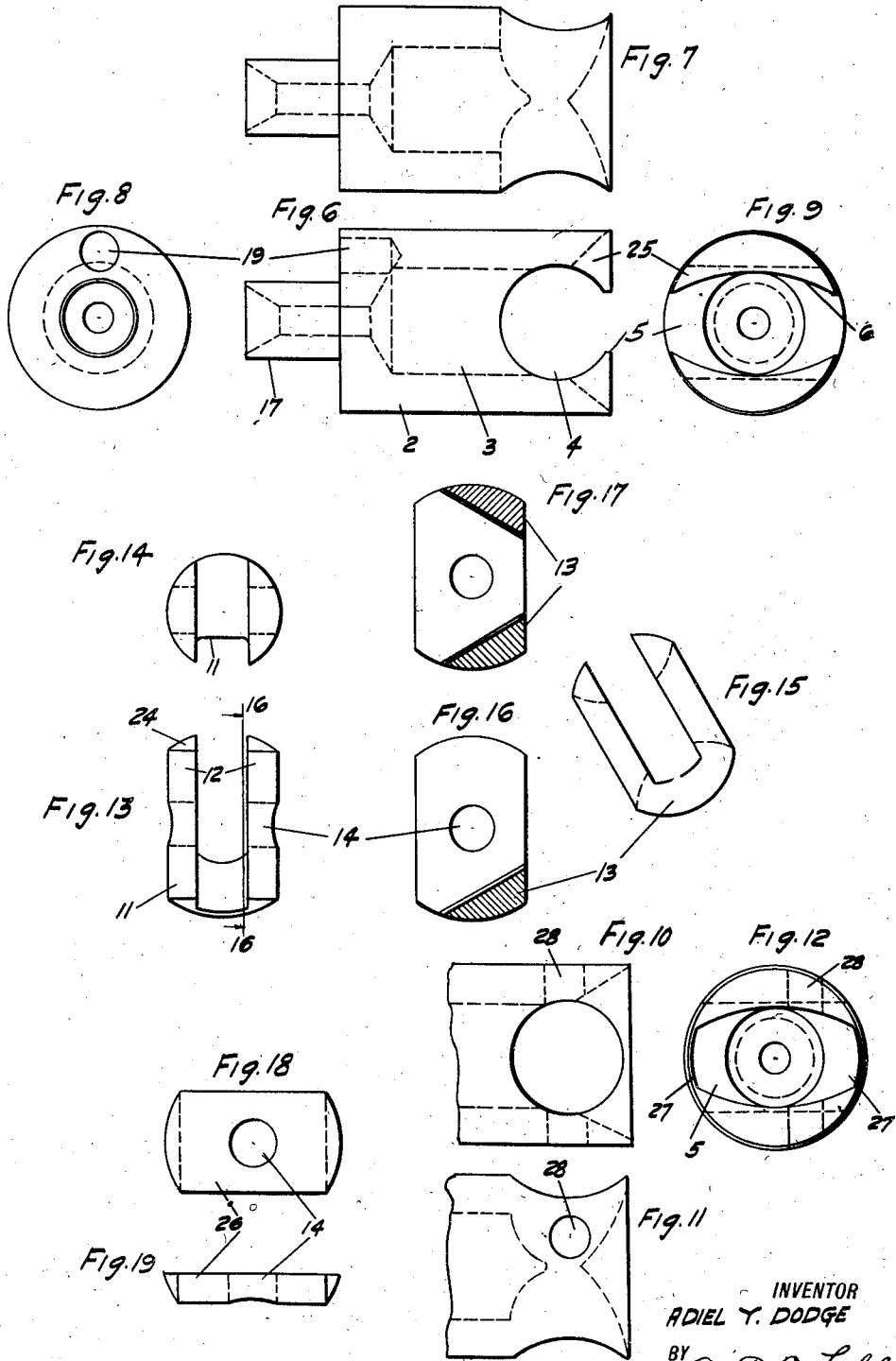
INVENTOR
ADIEL Y. DODGE
BY
A.D.T. Libby
ATTORNEY Patented June 14, 1927.

1,632,121

UNITED STATES PATENT OFFICE.

ADIEL Y. DODGE, OF SOUTH BEND, INDIANA, ASSIGNOR, BY MESNE ASSIGNMENTS, TO BENDIX BRAKE COMPANY, OF CHICAGO, ILLINOIS, A CORPORATION OF ILLINOIS.

UNIVERSAL JOINT.

Application filed March 7, 1924. Serial No. 697,472.

This invention relates to a universal joint and as illustrated is particularly adapted for use in connection with brake controls, especially on front wheels of an automotive vehicle. It is to be understood that the drawings are merely illustrative of how my invention may be put into practice.

It is the principal object of my invention to provide a universal joint which is flexible in its adaptability, and one that is composed of but a small number of parts that are simple and easy to manufacture.

Another object of my invention is to provide a universal joint in which the supporting member for one of the joint members functions in combination with the joint, per se, to hold the parts thereof in operative position, as well as to form a bearing for the devices which cover the joint to protect it from deleterious agents.

Other objects will be apparent after a study of the specification taken in connection with the annexed drawing, wherein:

Figure 1 is a sectional view through the parts making up the joint combination.

Figure 2 is a section on the line 2—2 of Fig. 1.

Figure 3 is a detailed view of the cam carried by one of the joint members.

Figure 4 is a view of the end of the operating shaft constituting a part of the joint.

Figure 5 is an end view of Fig. 4.

Figure 6 is a side view of the cam shaft constituting one of the elements of the joint.

Figure 7 is a top view of Fig. 6.

Figure 8 is a left hand end view of Fig. 6; while

Figure 9 is a right hand end view of Fig. 6.

Figure 10 is a fragmentary view of the right hand end of Fig. 6 showing a modified form of construction.

Figure 11 is a view of Fig. 10, 90 degrees therefrom.

Figure 12 is an end view of Fig. 10.

Figure 13 is an elevation of one of the joint elements;

Figure 14 being a top view thereof; and

Figure 15 being a perspective view; while

Figure 16 is a sectional view on the line 16—16 of Fig. 13.

Figure 17 is a view similar to Fig. 16, but showing a modified construction.

Figure 18 is a plan view of a modified form of one of the joint elements; and

Figure 19 is a side view of Fig. 18.

Referring now to the details wherein like numbers refer to corresponding parts in the various views, 1 is a carrier bracket support which houses the cam shaft 2, which in my preferred form is shown in detail in Figs. 6 to 9, inclusive. As shown in these figures, the cam shaft has two bores, a longitudinal one 3 and a transverse bore 4 near one end of the shaft, being so positioned as to leave a transverse opening 5 across the end of the shaft. The arcuate line 6 shown in Fig. 9 is produced by countersinking the longitudinal bore, after the transverse bore 4 has been made, for the purpose of giving a greater clearance to the end of the shaft 7 that is formed so as to enter the transverse opening 5 and the end 8 thereof is adapted to lie within the bore 4. The end 8 is formed or flattened on both sides 9 and is provided with a hole 10. To secure the end 8 within the bore 4 a retaining device 11 is used. The retaining device 11 has members 12 formed by milling a cut through the piece for the major part of its length, leaving, however, metal at 13, as more clearly shown in the sectional view, Fig. 16. The device 11 also has a transverse hole 14 therethrough to receive a pin 15. In the assembly of the joint, the shaft end 8 is moved sidewise in the slot 5, the members 12 passed over the top and bottom of the end 8 to engage the flattened surfaces 9, the pin 15 is pushed into place through the hole 14 and hole 10 of the shaft end 8; the shaft 7 is then moved to its central position, whereby the pin will be enclosed within the transverse bore 4 of the cam shaft 2.

Before the assembly of the universal joint as described, it is to be understood that the cam 16 is securely mounted on the reduced end 17, of the cam shaft 2. In the form shown, the cam 16 is held in rotative position by the anchor pin 23, which passes through the hole 18 in the cam and into a corresponding hole 19 in the end of the cam shaft. To prevent the cam from being displaced longitudinally on the cam shaft, a retaining collar 20 is placed over the reduced end 17 and the metal of the cam shaft is spun over as indicated at 21, Fig. 1, it being understood that the cam shaft is provided with a small transverse bore 22 through the reduced end. The bore 22 as well as the bore 3 serve also to lighten the cam shaft.

A unitary cam shaft is thus provided and after the joint assembly has been made as described, the cam shaft with the cam is then placed in the cam shaft housing or carrier bracket 1, the retaining collar 20 acting as an auxiliary journal for this end of the cam shaft. The ends of the member 11 are formed at 24 on substantially the same radius as the bore on member 1 which receives the cam shaft, and after the assembly has been completed as shown in Fig. 1, the members 12 are prevented from any transverse motion, thereby retaining the joint parts in operative position. As shown in Fig. 2, the members 12 substantially fill the portion of the transverse bore 4 on both sides of the shaft end 8 and are prevented from being withdrawn from the bore 4 by the overhanging lips 25. In other words, the width of the transverse opening or slot 5 in the cam shaft is less than the diameter of the transverse bore 4, whereby the joint members are retained in position in the transverse bore.

As an alternative construction for the device 11, I may use two separate pieces 26, as shown in Figs. 18 and 19, which may be made of extruded metal and then cut off and formed to the correct dimensions. A further alternative construction of the member 11 is shown in Fig. 17, wherein the metal 13 is left at both ends. In this construction, the device 11 is contemplated as being made of a die casting, no machine operations being required, and the shaft end 8 would then lie between the metal portions 13.

A further alternative construction of the end of the cam shaft is indicated in Figs. 10, 11 and 12, wherein the transverse slot across the end of the shaft does not go all the way across, but a rim 27 is left. In this construction the end of the shaft 8 is put through the slot 5 endwise and then pushed to one side so that the pin 15 may be passed through a transverse hole 28, after which the shaft is moved to its central position and the pin 28 is thereby prevented from dropping out.

The carrier bracket 1 will not be further described herein as it forms the subject matter of a separate application. It is then sufficient to say that the end 29 is formed spherical in shape and over this end is positioned a cover 30 having packing 31 to prevent dust, dirt, etc., from getting into the interior chamber.

In order to obtain sufficient movement for all makes of cars, I have found it necessary, at least in certain cases, to provide a cap 37 to ride over the outside of the cover 30. In order to hold the cover and cap in place and to take up wear, a resilient member in the form of a coiled lock washer 32 is used. This coil spring is retained in place by a split collar 33 which may be gripped to the shaft 7 by a screw or bolt 34. The knurled portion 35, shown on the shaft 7 in Fig. 4, is for the purpose of attaching an operating lever whereby the cam shaft may be operated and the nose 36 of the cam brought into engagement with the brake shoe or a brake operating member.

From what has been said it will be readily seen that I have provided a universal joint which is readily adaptable to be applied to the front wheels of an automotive vehicle for the purpose of operating the brakes used in connection therewith, and a joint which is readily responsive to all motions of the chassis, as well as the turning movements of the wheel. At the same time it will be appreciated that the universal joint may be used in other mechanical arrangements than that specifically herein described. It will also be observed that the construction of the two principal joint members may be reversed in position, and further from the alternative constructions herein referred to, it will be readily understood that my invention is susceptible of numerous changes in the details, without departing from the spirit of the same and the scope of the appended claims.

Having thus described my invention, what I claim is:

1. In combination, a rotatable shaft having a cam secured at one end and a transverse bore at the other end with a transverse opening through the latter end into the bore, said opening having a minimum width less than the diameter of the bore, and a second shaft having an end formed to enter the slot and bore in the first shaft with means for securing the second shaft end in oscillatable position in said bore consisting of; members formed to fit and substantially fill the bore on both sides of the second shaft end, said members being operatively fastened to said shaft end, a support enclosing all of the first mentioned shaft and cam, except the nose of the cam, said support acting to prevent said second shaft end from moving laterally out of said bore, and yielding means held in position by means on the second shaft for enclosing the joint end of said support.

2. In combination, a rotatable shaft having a reduced end portion with a cam mounted thereon, means for preventing rotation of the cam on the shaft and a journal collar fastened on said reduced end of the shaft, said shaft having at its other end a transverse bore with a transverse opening through the latter end into the bore, said opening having a minimum width less than the diameter of the bore, and a second shaft having an end formed to enter the slot and bore in the first shaft with means for securing the second shaft end in oscillatable position in said bore consisting of; members formed to fit and substantialy fill the bore on both sides of the second shaft end, said members being operatively fastened to said shaft end, a support enclosing said shaft and journal collar, but exposing the nose of the cam, said support acting to prevent said second shaft end from moving laterally out of said bore, and yielding means held in position by means on the second shaft for enclosing the joint end of said support.

3. In combination with a shaft assembly unit, comprising; a shaft having a reduced end, a cam on said end, an anchor pin passing through the cam into the shaft, a journal collar of the same diameter as said shaft positioned outside the cam and fastened to said shaft end, said shaft having in its other end a transverse bore with a transverse opening through the latter end into the bore, said opening having a minimum width less than the diameter of the bore; a second shaft having an end formed to enter the slot and bore in the first shaft with means for securing the second shaft end in oscillatable position in said bore consisting of; members formed to fit and substantially fill the bore on both sides of the second shaft end, said members being operatively fastened to said shaft end, a support enclosing said shaft assembly unit except the nose of the cam, said support acting to prevent said second shaft end from moving laterally out of said bore, and yielding means held in position by means on the second shaft for enclosing the joint end of said support.

4. In combination with a cam shaft, consisting of a shaft having a reduced end, a cam on said end, an anchor pin passing through the cam into the shaft, a journal collar of the same diameter as said shaft positioned outside the cam and fastened to said shaft end; an operating shaft connected to the cam shaft by means of a universal joint comprising; a transverse bore in the end of the cam shaft with a transverse opening of a minimum width less than the diameter of said bore through this end into the bore, a formed end of the operating shaft positioned in said bore and members fitting in the bore and substantially filling the same on both sides of the operating shaft end and fastened thereto, and a support for the cam shaft acting also to prevent lateral displacement of the opening shaft end and members fastened thereto, in said bore.

5. In combination with an assemby unit, including; a shaft having a transverse bore near one end, a cam, anchor means and a journal collar; constituting a cam shaft, an operating shaft connected to the cam shaft by means of a universal joint comprising; a formed end of the operating shaft adapted to be positioned in said bore and members formed and fitting in the bore on both sides of the operating shaft end and fastened thereto to prevent longitudinal disconnection of said shafts and a support for the cam shaft acting also to prevent lateral displacement, in said bore, of the operating shaft end and members fastened thereto.

6. In a universal joint the combination of, a shaft having a transverse bore entirely through the shaft and an opening therefrom across the end of the shaft, said opening having a minimum width less than the diameter of the bore, and a second shaft having a flattened end oscillatably held in said bore by means comprising members arcuately formed to fit and substantially fill the bore on both sides of the flattened end and pinned thereto, and means for preventing lateral displacement of the second shaft end from the bore and forming a bearing for the cam shaft.

7. A control comprising, in combination, a support having a cylindrical bearing opening, a shaft in the opening having a cross bore entirely through the shaft and inside of said opening, a second shaft having a flattened end extending into the end of said opening and projecting axially of the first shaft into the cross bore, a connecting device outwardly cylindrical and seated in the cross bore, said device having parts embracing between them the flattened end of the second shaft, and a pin passing through alined openings in the flattened end and in the said parts, the pin being held in position by the wall of the cross bore and the connecting device being held in position by the wall of the bearing opening.

8. A control comprising, in combination, a support having a cylindrical bearing opening, a shaft in the opening having a cross bore entirely through the shaft and an end slot opening into the bore, a second shaft having a flattened end extending through said slot and projecting axially of the first shaft into the cross bore, a connecting device outwardly cylindrical and seated in the cross bore, said device having parts embracing between them the flattened end of the second shaft, and a pin passing through alined openings in the flattened end and in said parts, the wall of the cross bore blocking escape of the pin and the wall of the bearing opening blocking the ends of the cross bore.

9. A control comprising, in combination, a bracket having a bearing for a shaft, two shafts extending into opposite ends of the bearing, and a universal joint connecting the ends of the shafts inside of the bearing and including a member extending crosswise of the shafts and held against movement crosswise of the shafts only by the inside wall of the bearing.

10. A cam and shaft subassembly for a front brake control comprising a member having a short cylindrical shaft portion to be embraced by a bearing, a cam carried by said member and arranged at one end of the cylindrical portion, there being a cylindrical bore extending crosswise entirely through the member at its opposite end and intersecting the end face of said member so that the bore is open across the end of said member and is approximately C shaped in cross-section taken axially of the shaft portion.

In testimony whereof, I affix my signature.

ADIEL Y. DODGE.